United States Patent [19]

Trampnau

[11] Patent Number: 4,528,564
[45] Date of Patent: Jul. 9, 1985

[54] WARNING DEVICE FOR HELICOPTERS

[76] Inventor: Ulrich Trampnau, Ungererstrasse 19, 8000 Munich 40, Fed. Rep. of Germany

[21] Appl. No.: 517,941

[22] Filed: Jul. 28, 1983

[30] Foreign Application Priority Data

Jul. 30, 1982 [DE] Fed. Rep. of Germany ....... 3228557

[51] Int. Cl.³ .............................................. G08G 5/00
[52] U.S. Cl. .................................. 340/946; 340/941; 340/963; 73/178 H; 73/178 T; 364/433; 244/17.11
[58] Field of Search ............... 340/945, 946, 960, 963, 340/967; 73/178 R, 178 T, 178 H; 244/17.11, 180, 181, 183, 7 TA; 343/450, 453, 458, 12 R, 12 A, 5 HE; 364/427, 433

[56] References Cited

U.S. PATENT DOCUMENTS

| | | | |
|---|---|---|---|
| 3,250,121 | 5/1966 | Schwartz | 73/178 H |
| 4,027,838 | 6/1977 | Barnum | 340/946 |
| 4,058,710 | 11/1977 | Altmann | 244/183 |
| 4,293,840 | 10/1981 | Hadari | 340/946 |

Primary Examiner—James J. Groody
Assistant Examiner—Michael F. Heim
Attorney, Agent, or Firm—Laff, Whitesel, Conte & Saret

[57] ABSTRACT

A warning device, for a helicopter with a tail rotor and a mechanical protection device (15) therefor, for giving warning if the helicopter tail approaches too closely the ground or an obstruction. The warning device comprises a height-finder (11) with a transmitting/receiving antenna (26) mounted at the helicopter tail to produce a height-finding beam backwards and obliquely downwards. Height signals are processed by computing means (12) to determine the sink rate of the tail and in dependence upon this sink rate and the instantaneous height, a warning signal is initiated if this corresponds to a predetermined relative relationship. The higher the sink rate the greater is the height at which the warning signal is initiated and vice versa.

In the preferred arrangement the beam is directed substantially along or parallel to the axis of the mechanical protection device (15).

8 Claims, 3 Drawing Figures

WARNING DEVICE FOR HELICOPTERS

The present invention relates to a warning device, for a helicopter with a tail rotor, which emits a warning signal when the tail is in such a position as to be in danger of making contact with the ground or an obstruction.

Statistics show that contact with an obstruction (very commonly with the ground) by the tail rotor of a helicopter is a major cause of helicopter accidents. This occurs both in ordinary flight situations as well as in so-called auto-gyro or auto-rotation landings (landing with a switched off or a defective motor).

The critical flying phase in an auto-rotation landing of a helicopter is, as is known, the so-called flare, that is tilting the helicopter (the tail hangs obliquely downwards) immediately before the helicopter is set on the ground. This flare should be carried out at as low a level as possible, because the helicopter drops to the ground almost in free-fall from the flare position. On the other hand, however, there is the danger in carrying out the flare at low level that the obliquely downwardly hanging tail, and therefore the tail rotor secured to it, will touch the ground, with the result that the helicopter, which no longer has any counter moment, will turn abruptly. It is extremely difficult for the pilot to recognize when the optimal flare altitude has been reached, particularly in bad visibility. But even in perfect visibility, it is almost impossible for even experienced pilots to accurately judge the distance of the tail, which is several meters away from him, from the ground. Added to this is the fact that even small changes in the angle of inclination of the helicopter lead to considerable changes in altitude of the long tail, and that the rate of vertical descent in each case is of considerable importance.

If the flare is carried out at too high an altitude then, after the rotors have slowed down, the helicopter sinks too rapidly and, in landing, the landing gear and backbone may be damaged. Should the pilot attempt to correct for the rapid sink rate by increasing the pitch too much, then the main rotor blades, with their low rotation energy, bend and may slice into the tail cone or even the forward cabin. Pilots are, therefore, urged in training to first "go for the ground then flare".

The risk then occurs that the flare is carried out at too low an altitude and the tail and tail rotor come into contact with the ground.

The tail rotor can contact the ground even though all helicopters with a tail rotor have a mechanical protection device. This device may consist simply of an arm or bar structure which extends from the tail from in front of the rotor downwardly and then rearwardly to a level below the level of the arc described by the tips of the blade. In other cases it is formed by a bar on a tail fin. The specific extent and the direction of the axis of the mechanical device is approved for each helicopter by the official flight worthiness certifying authority of a country and is specifically for protection in the flare situation. However, if, as is natural, the pilot has sought the softest ground, e.g. a ploughed field, the mechanical protection arm or device for the tail rotors may enter the soft ground without the pilot being aware of it and then the tail rotor will contact.

Therefore, in spite of the recognized fact that autorotation landings ought to be practised in order to give the pilot appropriate instruction for an emergency, there has been a tendency to refrain from carrying out such exercises with the motor switched off up to touch down because such exercises have been shown to be very prone to incurring damage.

Simulated power failure, with training auto-rotation landings at the about right altitude followed by power recovery, i.e. switching-in of power when the flare position is reached, is therefore a very common form of training. This can never be a satisfactory replacement for totally realistic fully power switched-off practice landings since it does not represent emergency conditions. However, the fact that in recent years tail contact accidents have occurred in training flights even with very experienced instructors on board have resulted in fully switched-off practice auto-rotation landings being avoided in many cases.

One warning device for giving warning of likely ground contact by the helicopter tail is proposed in German Offenlegungsschrift No. 25 49 884. In this proposal, the device comprises, in addition to a device determining the flying altitude of the helicopter, a device responding to the attitude of the helicopter, and a computer receiving the output signals from both devices, which computes the proximity of the helicopter tail to the ground from the flying altitude, the rate of vertical descent and the attitude, and emits a warning signal when a certain threshold value is reached. This known device assumes that the two devices determining the flying altitude and attitude are both necessary and are operating absolutely exactly, i.e. expensive measuring instruments, namely a precision altimeter and a precision vertical gyro, must be built into the helicopter. The devices are mounted at the front of the helicopter and they would have to be calibrated and set up very accurately to allow for the long tail since, as mentioned, small changes of inclination make a large difference in the height of the tail rotor. For this reason, the device is also intended essentially for first fitting-outs of large helicopters. Subsequently fitting existing smaller and simple helicopters, particularly those for practice purposes, is almost impossible for economic reasons. It is also considered that the device could not be clearly successful in practice because of its complexity. To the best of the applicant's knowledge, a practical arrangement in accordance with this proposal has not been put on the market—at least in Europe.

It is therefore the aim of the present invention to provide a warning arrangement of the type described which, whilst effective in flight, is simple and relatively cheap such that it can be fitted as standard equipment into all forms of helicopter including small and inexpensive helicopters.

It is also the aim to provide a warning arrangement that can be mounted quickly and in a straightforward manner on to existing helicopters, without requiring major modifications, for permanent use or for temporary training use.

The present invention arises from the realization that all the previously proposed devices are too complicated or inadequate because they are positioned in the wrong place. In all the previous helicopter warning devices, the height-finder has been positioned at the front. In this position, pointing forwards and downwards it protects the craft by giving the pilot warning of an obstruction ahead of the helicopter which is being approached too low for safety. If the tail is to be protected with such an arrangement an attitude indicator, with its added expense and complexity is necessary as proposed in German OLS No. 25 49 884. Since the tail rotor is the portion at risk in auto-rotation landings or tail damage risk situations, the inventor realized that the warning device height-finding element should be positioned near the tail and if this is done, the need for attitude measurements can be avoided, the weight and complexity of the warning arrangement can be minimized, and the device made to function more effectively.

Therefore, a warning device, for a helicopter with a tail rotor and a tail rotor mechanical protection device in accordance with the present invention comprises a height-measuring device with transmitting and receiving means for a high frequency electromagnetic wave beam used in the height measurement, computing means for determining from the height measurements of the height measuring device, the speed of approach to the ground or obstruction in the path of the beam and for initiating a warning signal if the speed of approach relative to the instantaneous height corresponds to a predetermined value characterized in that the transmitting and receiving means are positioned at the tail of the helicopter and such that said electromagnetic wave beam is directed backwards and obliquely downwards.

To be most effective, the direction of the beam is preferably substantially along or adjacent and parallel to the axis of the tail rotor mechanical protection device.

The warning device according to the invention emits warning signals when the tail of the helicopter comes "too close" to the ground, the warning distance not being a constant, but depending on the rate of vertical descent of the helicopter. The microprocessor or computing means of the warning device is, therefore, programmed, for each helicopter type, so that the distances from the ground at which the warning signals are released are greater, the greater the rate of vertical descent of the helicopter.

The warning device, therefore, gives the pilot an aid, which enables him to carry out auto-rotation without any danger of tail impact. Useful training in auto-rotation landing is, therefore, made possible even in the absence of an instructor.

To enable the device to be used only in training flights or as a simple "add-on" module to existing helicopters, the device can be contained in a housing with releasable clamps for clamping the housing to the tail and in this case the device preferably includes an aircraft frequency transmitter for transmitting the warning signal to the helicopter radio receiver and an independent power supply. It can, of course, be enough for a helicopter flying school to have one or two such warning devices, which are then mounted on the helicopters with which it is desired to practice an auto-rotation landing.

For practice auto-rotation landings, the "add-on" device version should have its own current supply and, therefore, operate completely independently. It is also important that the arrangement, particularly when using radar beams, can be kept very small and weighs only a small amount, approximately 1 kg.

One embodiment of a warning device according to the present invention is shown, by way of example, in the accompanying drawings in which.

Figure 1:
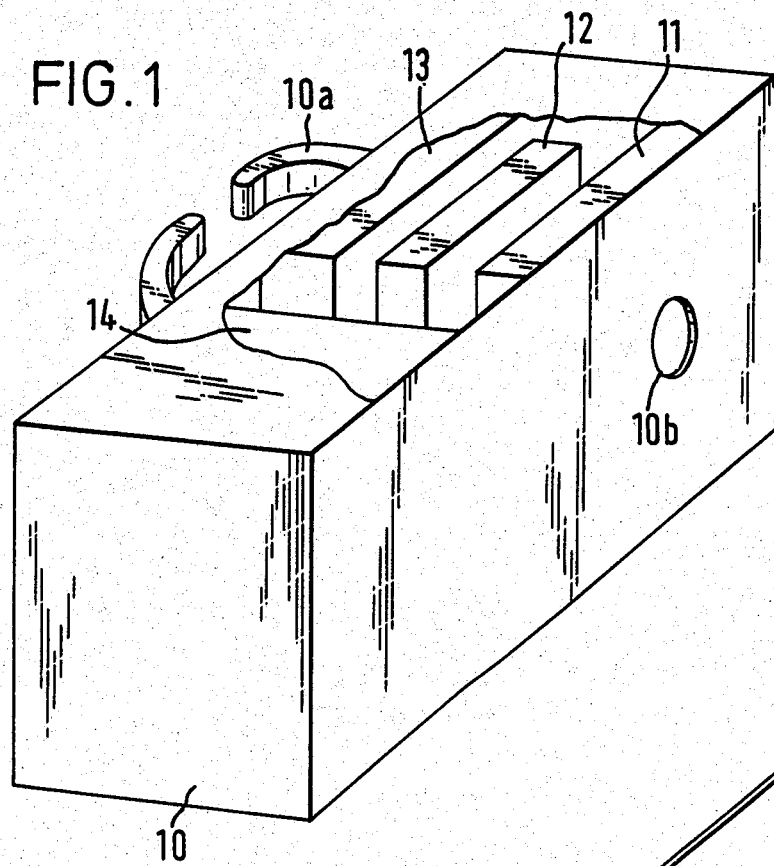
FIG. 1 shows a warning device as an "add-on" module in perspective representation in sketch-form, one part of the housing being broken away.

As shown in FIG. 1, the "add-on" device is housed in a protective housing 10 which has securing clamps 10a on one of its sides. There are accommodated in the housing a radar height-finder unit 11, a computer or microprocessor unit 12, a radio transmitter unit 13 and an electrical battery power supply 14. 10b denotes an aperture in the protective housing 10, through which the height-finder 11 emits a radar beam. The signal output of the height-finder 11 is connected to the computer 12 whose output then controls the radio transmitter 13. The current supply for the devices 11, 12 and 13 is provided by the battery power supply 14.

Figure 2:
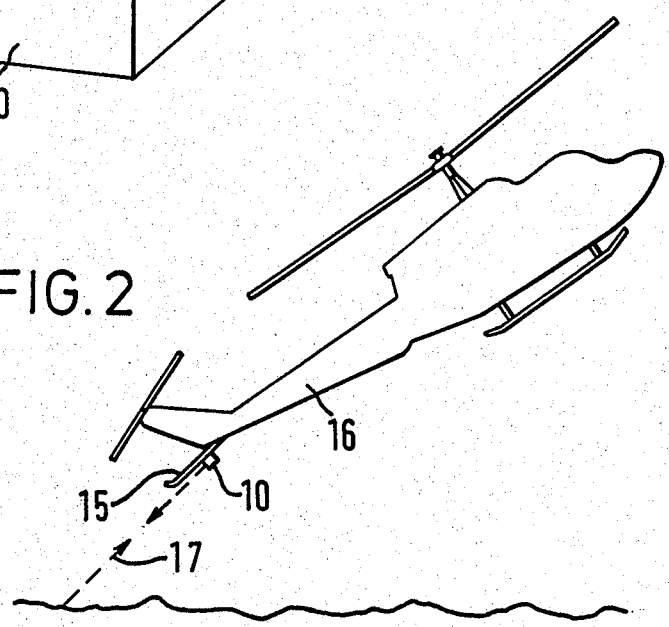
FIG. 2 shows in diagrammatic form the warning device of FIG. 1 mounted on the tail portion of a helicopter.

FIG. 2 shows diagrammatically the warning device of FIG. 1 mounted on the mechanical protection device 15 of the tail 16 of a helicopter with a tail rotor. As can be seen, this mechanical device consists of an arm or bar structure extending downwardly, from in front of the tail rotor, to extend under the lower arc traced by the tips of the tail rotor blades. The device is mounted so that the axis of the radar beam is substantially in line with or parallel with the axis of the bar.

Figure 3:
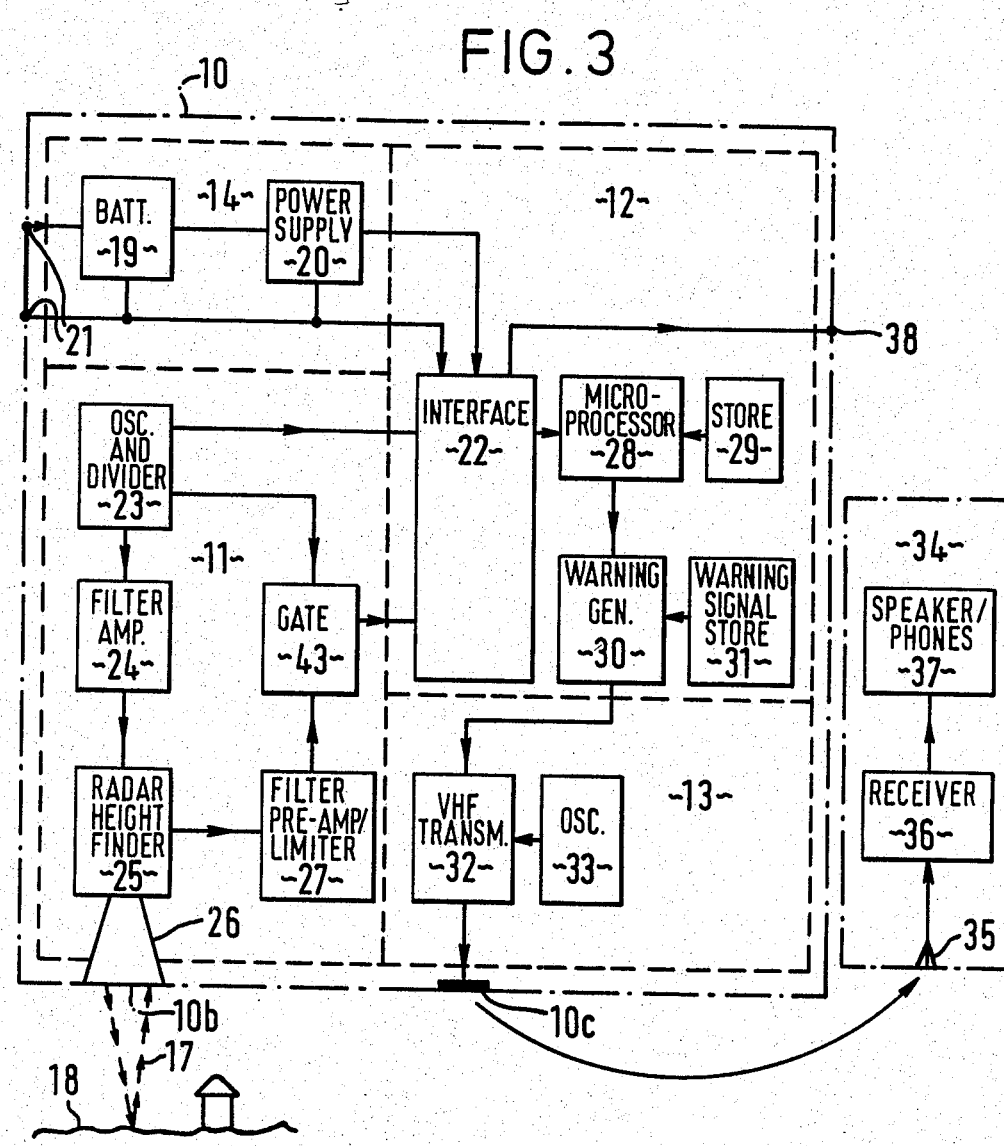
FIG. 3 shows a block circuit diagram of a warning device according to the invention.

A block diagram circuit arrangement of the warning device of FIGS. 1 and 2 is shown in FIG. 3. In this circuit, diagram parts corresponding to the parts illustrated in FIGS. 1 and 2 have been given the same references. The housing 10 is indicated by a dot/dash line with the opening 10b at its lower end and the units 11 to 14 are surrounded by dashed lines. Through the opening 10b the radar beam 17 is transmitted and received from the ground 18.

The battery power supply 14 comprises a battery or accumulator 19 and a power supply arrangement 20 which converts the battery output into appropriate voltages for the other circuit elements of the warning device. Battery charging and battery test signal sockets 21 are provided on the housing 10. Outputs from the power supply 20 are connected for battery testing to an interface unit 22 which forms part of the microprocessor device 12. Power is supplied for operation by means not shown from supply 14 to the units 11, 12 and 13. The radar height-finding arrangement comprises a timing oscillator and divider unit 23 which has outputs coupled to the interface unit 22, a gate circuit 43 and a filter and modulation amplifier 24. The output of the filter and modulation amplifier unit is coupled to an X-band height-finder radar module 25. Different forms of module can be used, one suitable example being that made by Plessey Ltd. under the type number GDSM2. The radar signal output of the module 25 forms, through the antenna 26, the radar height-finding beam 17 and the height output of the module 25 is coupled via a filter and pre-amplifier/limiter unit 27 to a gate 43. The output from gate unit 43 is fed via the interface unit 22 to a microprocessor calculator 28.

The microprocessor unit 12 comprises in addition to the calculator unit 28 a store 29, for storing calculation constants and which is coupled to the calculator 28. An output of calculator 28 is coupled to a warning tone generator 30 which is also fed by a warning signal store 31, the parts 30 and 31 also forming part of the overall microprocessor unit 12.

The VHF radio transmitter unit 13 comprises a standard flight VHF radio transmitter 32, for example a King transmitter and this unit 32 has a quartz controlled transmitter oscillator unit 33. The output of the radio transmitter 13 is coupled to a transmitting antenna 10c.

Also shown in FIG. 3 is part of the helicopter instrumentation referenced 34. This comprises the normal radio receiving antenna 35 coupled to the standard flight radio receiver 36 the output of which is coupled to a loudspeaker or head-phones unit 37.

Finally, the housing 10 has a servicing or test socket 38 by which signals can be checked for the units via the interface 22.

The arrangement of FIG. 3 operates as follows:

Battery 19 provides power to the power supply unit 20 which converts the voltage of battery 19 into the appropriate voltage levels for operation of and supplies these voltages via means not shown to the units 11, 12 and 13. Output from the power supply unit is also coupled to the interface unit 22 so that following a battery test input on socket 21 a battery test is performed by the microprocessor unit 12.

The radar height-finding or altimeter unit 11 operates in normal manner. The radar module 25 is supplied with a continuous wave modulation signal by means of the timing oscillator and divider unit 23 and the filter and modulation amplifier 24. The modulated radar signal is beamed to the ground and the return signal is processed in module 25 to derive the instantaneous height of the helicopter tail above the surface of the ground or other obstruction in the path of the beam 17. The processed signals are fed to the filter and pre-amplifier unit 27 and the amplified height representative output signals of unit 27 are fed to the gate 43. Gate 43 is opened periodically by sampling signals from the timing oscillator 23 and the height signals are passed by the opened gate to the microprocessor calculator 28 via the interface 22.

The microprocessor calculator 28 calculates, using timing signals received from the unit 23 and the sampled height signals from the height-finder 11, the sink rate of the helicopter tail portion. The sink rate and the instantaneous height are compared with calculation constants from the store 29 and, if the height falls below a predetermined limit for the relevant sink rate, a warning signal is generated and fed to the warning tone generator 30.

The warning tone generator 30 transmits a warning in accordance with the warning signals stored in the store 31 to the radio transmitter 32 which transmits it via the transmission antenna 10c. This transmitted warning signal is received over the normal VHF radio receiver 36 from the antenna 35 and a warning will be heard by the pilot either over the loudspeaker or the head-phones 37.

The rate of sampling of the height signal by gate 43 and timing oscillator 23 may be lower at higher altitudes than at low altitudes and arrangements not shown may be provided to vary the sampling rate dependent upon the instantaneous height measurement.

The stores 31 and 29 may be made exchangeable so as to provide respectively for different types of warnings and also to provide for different calculation constants appropriate to different types of helicopters.

Similarly, the transmission oscillator 33 may be changeable to provide for the different receiving frequencies of the receiver of the different helicopters to which the unit may be fitted. If the transmitter 32 is a broad band transmitter, this will avoid the need for many otherwise necessary changes of the transmission "oscillator". This will not unduly interfere with other air traffic since it is intended that the transmission range should be small, e.g. not exceeding the 50 m range, and only sufficient to be reliably picked up by the helicopter receiver The device shown can, of course, be changed in many ways. This concerns particularly the shape of the housing 10, which is advantageously of an aerodynamic design. The height-finder 11 can also, for example, operate with laser beams or other electromagnetic wave radiation, but for reasons of size and weight a radar height-finder indicator is to be preferred. The microprocessor unit 12 can also be replaced by another electronic computer. It is advantageous if the microprocessor 12 is suitable for storing several fixed programs, because it is then particularly simple to use the same device both for the auto-rotation landing and for other flying maneuvers in different helicopters.

Clearly, a warning device according to the invention can be fitted as permanent equipment in the original construction of a helicopter. In this case it may be preferable to mount solely the transmitting/receiving antenna of the radar height-finder at the end of the tail portion, the remainder of the equipment being mounted in the cabin section. However, since the equipment may be so small, most of it may be mounted at the tail in this original fitting version also. Obviously, the transmitter 13 would not be needed and the warning signal could be brought to the pilot in any more convenient way.

I claim:

1. A warning device, for a helicopter with a tail rotor and a tail rotor mechanical protection device, which device produces a warning signal when the tail is in such a position as to be in danger of making contact with an obstruction or the ground and comprises a height-measuring device with transmitting and receiving means for a high frequency electromagnetic wave beam used in the height measurement, the transmitting and receiving means being positioned at the tail of the helicopter such that the electromagnetic wave beam is directed backwards and obliquely downwards, and computing means for determining from the height measurements of the height measuring device, the speed of approach to the ground or obstruction in the path of the beam and for initiating a warning signal if the speed of approach relative to the instantaneous height corresponds to a predetermined value.

2. A warning device according to claim 1 wherein the direction of said electromagnetic wave beam is substantially along or adjacent and parallel to the axis of a tail rotor mechanical protection device.

3. A warning device according to claim 1 wherein the transmitting and receiving means are mounted on a tail rotor support device.

4. A warning device according to claim 2 wherein the transmitting and receiving means are mounted on a tail rotor support device.

5. A warning device, for a helicopeter with a tail rotor, said device producing a warning signal when the tail is in such a position as to be in danger of making contact with an obstruction or the ground, said device comprising a height-measuring means with transmitting and receiving means for a high frequency electromagnetic wave beam used in the height measurement, the transmitting and receiving means being positioned at the tail of the helicopter such that the electromagnetic wave beam is directed backwardly and obliquely downwardly, computing means responsive to said height measurement means for determining the speed of approach to the ground or obstruction in the path of the beam and for initiating a warning signal if the speed of approach relative to the instantaneous height corresponds to a predetermined value, wherein the computing means and height measuring means are contained in a housing together with an aircraft frequency radio tarnsmitter means and an independent power supply for the measuring means, the computing means and the radio transmitter means, and releasable mounting means on the housing to enable its releasable mounting onto a helicopter, and means for passing said warning signals indicated by the computing means to and transmitting them by the radio transmitter means to be received over the standard helicopter radio receiver.

6. The warning device according to claim 5 wherein the direction of said electromagnetic wave beam is substantially along or adjacent and parallel to the axis of a tail rotor mechanical protection device.

7. The warning device according to claim 5 wherein the height measuring transmitting and receiving means are mounted on a tail rotor support.

8. A warning device for a helicopter with at least a tail rotor, said device producing a warning signal during at least a flare in an auto-rotation landing when the tail rotor is in a position which is in danger of making contact with an obstruction, the warning being given in time for the pilot to level the helicopter before such contact, the warning device comprising a height measuring means having transmitting and receiving means mounted on the tail rotor support for a transmitting and receiving energy wave beam used in the height measurement, the transmitting and receiving means being positioned at the tail of the helicopter such that the wave beam is directed backwardly and obliquely downwardly, computing means responsive to height measurement means for detecting the speed of approach to the ground or obstruction in the path of the beam and for initiating a warning signal if the speed of approach relative to the instantaneous height corresponds to a predetermined value.

* * * * *